United States Patent Office 3,359,081
Patented Dec. 19, 1967

3,359,081
PROCESSES AND PRODUCTS
Charles W. Tullock, Chadds Ford, and Donald D. Coffman, West Chester, Pa., assignors to E. I. du Pont de Nemours and Company, Wilmington, Del., a corporation of Delaware
No Drawing. Filed Apr. 26, 1963, Ser. No. 276,066
12 Claims. (Cl. 23—367)

This application is a continuation-in-part of our co-assigned, copending application, Ser. No. 92,179, filed Feb. 28, 1961, now abandoned.

This invention relates to hexavalent sulfur halides and to their methods of preparation.

Presently, there is great interest in the generally unknown hexavalent sulfur chlorofluorides and particularly in sulfur chloride pentafluoride, which has only recently been prepared and characterized as an acid stable, alkali hydrolyzable, gaseous compound. New methods of preparing sulfur chloride pentafluoride are desired since the methods of preparation heretofore described, i.e., the direct fluorination of sulfur dichloride or the chlorination of disulfur decafluoride, are hampered by low yields and excessive by-product formation. Consequently, it is an object of this invention to provide a process for the preparation of sulfur chloride pentafluoride in high yields with a minimum of by-production formation.

By the process of this invention, sulfur chloride pentafluoride, $SF_5Cl$, can be prepared in excellent yield by the reaction of chlorine with sulfur tetrafluoride and a fluoride of a univalent Group I metal having an atomic number of 11–55, i.e., sodium, potassium, rubidium, cesium or silver. This synthesis can be accomplished in one step by including all three reactants initially, or in two steps by first reacting sulfur tetrafluoride with the metal fluoride to form an adduct, $SF_4 \cdot MF$, and then reacting this adduct with chlorine to form $SF_5Cl$. These novel adducts $SF_4 \cdot MF$, where M represents the univalent Group I metal, can be isolated; and the provision of these adducts is a further object of this invention.

The preparation of sulfur chloride pentafluoride by the one-step method is carried out in the range of from 0 to 500° C. The higher temperatures within this range are employed in continuous operations where shorter contact times are used. However, when the reaction is conducted in a closed vessel under the autogenous pressure of the reactants, 350° C. is the maximum practical temperature. A temperature in the range of from 25° to 350° C. is preferred. The preferred metal fluoride is cesium fluoride. Inert gaseous or liquid diluents can be used, if desired, but their use is not necessary. In the usual procedure for loading the reaction vessel, the metal fluoride is introduced at ambient atmospheric temperature and pressure. The vessel is closed, evacuated and cooled, and the highly volatile sulfur tetrafluoride and chlorine are introduced by gaseous transfer. Heating of the reaction mixture to the desired temperature can be accomplished by a procedure wherein the temperature is held for short periods of time at intermediate levels. This method permits smooth operation and avoids sudden increases in the reaction pressure. However, the multi-stage heating procedure is not essential, and the reactants can, if desired, be heated directly to the reaction temperature.

The two-step method of preparing sulfur chloride pentafluoride is carried out in the same manner as the one-step method just described, except that chlorine is omitted in the initial loading of the reaction vessel. In the absence of the chlorine, sulfur tetrafluoride and the metal fluoride react under the temperature conditions described above to form a solid adduct which can be isolated, if desired, merely by removing it from the reactor as in Part A of Example I. The reaction vessel containing the solid adduct, whether previously isolated or formed in place, is cooled and evacuated, and chlorine is then admitted. The second step consists in the reaction of chlorine with the solid adduct to produce sulfur chloride pentafluoride. Reaction will occur at the temperatures employed in the first step; however, it is not essential that identical temperatures be employed.

The solid adduct formed in the first step of the two-step procedure corresponds to a composition containing one molar part of metal fluoride in combination with one molar part of sulfur tetrafluoride. The adducts, represented by the formula $SF_4 \cdot MF$ as previously defined, are highly water-sensitive and produce fumes when exposed to the atmosphere, but they are stable at room temperature and can be stored under anhydrous conditions.

The molar proportions of the reactants are not critical since excess starting materials can be recovered and re-used. The following equations show the stoichiometrics of the one-step process (A) and the two-step process (B):

A. $$SF_4 + Cl_2 + \rightarrow SF_5Cl + MCl$$

B. 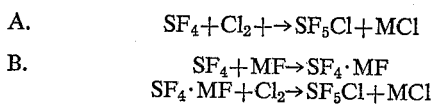
$$SF_4 + MF \rightarrow SF_4 \cdot MF$$
$$SF_4 \cdot MF + Cl_2 \rightarrow SF_5Cl + MCl$$

The molar proportions shown in these equations are recommended for economy of operation, but departures from these proportions do not alter the essential nature of the recations.

Anhydrous conditions are assured because both sulfur tetrafluoride and the $SF_4 \cdot MF$ adducts are strongly reactive with water, but it is advantageous to employ substantially anhydrous chlorine and metal fluoride in order to avoid wasteful use of sulfur tetrafluoride and formation of undesirable impurities by adventitious hydrolysis.

Isolation and purification of sulfur chloride pentafluoride is readily accomplished by fractional distillation of the reaction mixture, the volatile components of which usually include unchanged sulfur tetrafluoride and chlorine and may include adventitious products of hydrolysis such as thionyl fluoride, sulfur dioxide and hydrogen fluoride. Excess chlorine can also be removed prior to the distillation by adding sulfur and allowing the mixture to stand at room temperature.

The material of which the reaction vessel is constructed is not critical in the process, but it is generally advantageous to use a vessel which is resistant to attack by components of the reaction mixture. Suitable reaction vessels can be made of nickel, Monel or nickel-iron-molybdenum alloys.

The invention is illustrated in greater detail in the following examples. Examples II, III and IV illustrate the one-step method, and Example I illustrates the two-step procedure.

*Example I*

A. A 1-liter pressure vessel containing 46 g. (0.30 g. mole) of cesium fluoride, kept under reduced pressure by means of an oil pump, was heated to 300° C. for 2 hours in order to remove any traces of moisture. The evacuated vessel was then cooled to —77° C., and 324 g. (3.0 g. mole) of sulfur tetrafluoride was introduced by gaseous transfer from an attached cylinder. The vessel was closed and the contents were heated under autogenous pressure successively at 150° C. for 1 hour, at 200° C. for 1 hour, and at 250° C. for 1 hour. The white solid product, which was removed from the reactor at room temperature and pressure under an atmosphere of nitrogen in a dry-box, weighed 74.15 g. (94.3% of the theoretical amount). It was found by test to be extremely moisture-sensitive.

Analysis for $CsF_5S$: Calc'd: Cs, 51.2; F, 36.5; S, 12.3 Found: Cs, 48.2; F, 35.0; S, 11.4.

The X-ray pattern, obtained on a powder sample of this product in a sealed tube, showed the following relatively strong interplanar spacing lines ($d$) expressed in Angstroms: 4.287, 3.966, 3.880, 3.056, 2.891, 2.409, 2.154, 1.947, 1.928, 1.894, 1.776, 1.729, 1.646, 1.449, 1.426, 1.374, 1.199, 1.120, 1.082. These data demonstrated the product to be free of cesium fluoride (CsF) and elemental sulfur. For comparison: the strong $d$ lines for CsF are 3.48, 3.00, 2.12, 1.816, 1.739, 1.505, 1.382, 1.345; and for sulfur the strong $d$ lines are 3.85, 3.44, 3.21.

B. A mixture of 85 g. (0.33 g. mole) of the $SF_4 \cdot CsF$ adduct, prepared as in Part A, and 30 g. (0.42 g. mole) of chlorine was heated under autogenous pressure, successively at 100° C. for 1 hour, at 150° C. for 1 hour and 175° C. for 1 hour. The volatile product (50 g.) was estimated by infrared analysis (cf., Roberts, J. Chem. Soc. 1960, 666) to contain 45 mole percent of sulfur chloride pentafluoride, the remainder being mostly chlorine.

*Example II*

A mixture of 108 g. (1.0 g. mole) of sulfur tetrafluoride, 172 g. (1.1 g. mole) of anhydrous cesium fluoride and 71 g. (1.0 g. mole) of chlorine was heated under autogenous pressure, successively at 100° C. for 1 hour, at 150° C. for 1 hour and 175° C. for 1 hour, in a 500 ml. pressure vessel constructed of a nickel-iron-molybdenum alloy. The volatile product was distilled to give 31 g. of yellow distillate, B.P. —40 to —26° C., and 124 g. of colorless product, B.P. —23 to —21.5° C. The colorless product was identified as sulfur chloride pentafluoride by infrared analysis, and its weight equaled 76.4% of the theoretical amount.

Rubidium fluoride is equivalent to and may be substituted for cesium fluoride in the above process to prepare sulfur chloride pentafluoride.

*Example III*

A mixture of 108 g. (1.0 g. mole) of sulfur tetrafluoride, 127 g. (1.0 g. mole) of silver fluoride and 71 g. (1.0 g. mole) of chlorine was heated under autogenous pressure, successively at 100° C. for 1 hour, at 150° C. for 1 hour and at 175° C. for 1 hour, in a 500 ml. pressure vessel constructed of a nickel-iron-molybdenum alloy. There was obtained 163 g. of volatile product, which was distilled to yield 120 g. of yellow material, B.P. —43° C. to —35° C., and 35 g. of colorless product, B.P. —25 to —21° C. The colorless fraction was identified as sulfur chloride pentafluoride by mass spectrometric analysis and by its infrared absorption spectrum. The yellow fraction contained unreacted chlorine and sulfur tetrafluoride in addition to sulfur chloride pentafluoride. The weight of the solid residue (139 g.) in the reaction vessel indicated that 72.7% of the sulfur tetrafluoride was converted to sulfur chloride pentafluoride.

*Example IV*

A mixture of 108 g. (1.0 g. mole) of sulfur tetrafluoride, 58 g. (1.0 g. mole) of potassium fluoride and 71 g. (1.0 g. mole) of chlorine was heated under autogenous pressure, successively at 175° C. for 1 hour, at 250° C. for 1 hour and at 300° C. for 2 hours, in a 500 ml. pressure vessel constructed of a nickel-iron-molybdenum alloy. Distillation of the total volatile product (194 g.) yielded 178 g. of yellow distillate, B.P. —40.5° to —36° C., and 11 g. of undistilled residue. The residue was found by infrared analysis to contain 30–35% sulfur chloride pentafluoride. Chloride analysis of the solid remaining in the pressure reactor suggested that 19.7% of the reactants were converted to sulfur chloride pentafluoride.

If good yields are to be obtained in the preparation of sulfur chloride pentafluoride, it is important to use preformed sulfur tetrafluoride as in the examples described above. Sulfur tetrafluoride is obtainable by the reaction of sulfur and cobalt trifluoride (cf., Ephraim, "Inorganic Chemistry," Interscience Publishers, Inc., 5th ed., 1949, p. 609), and it can also be prepared from sulfur, chlorine and an alkali metal fluoride by the method of assignee's copending application Ser. No. 798,828. It is now known that if, in place of preformed sulfur tetrafluoride, the sulfur, chlorine and alkali metal fluoride reactants of the above-mentioned application Ser. No. 798,828 are employed, sulfur chloride pentafluoride is obtained as a by-product but the yields are impractically low. Thus, when sulfur and chlorine in 1:3 molar ratio are heated with excess cesium fluoride under autogenous pressure at 175° C., the major product of the reaction is sulfur tetrafluoride, and sulfur chloride pentafluoride is obtained in only minor proportions.

Sulfur chloride pentafluoride is a useful hexavalent sulfur compound which is now available by a practical process, i.e., the process of this invention. Sulfur chloride pentafluoride is useful as a photoinitiator for the polymerization of tetrafluoroethylene (cf., Belgian Patent 578,142), and is also useful as an intermediate in the preparation of compounds containing the $SF_5$— group.

The adducts of formula $SF_4 \cdot MF$ can be used as replacements for gaseous sulfur tetrafluoride in synthesis reactions where the non-volatile solid form of the adducts is preferred. In general, the reactions of the adducts are the same as those of free sulfur tetrafluoride. For example, reaction of $SF_4 \cdot CsF$ with cyanogen chloride at 100° C. yields trifluoromethyliminosulfur difluoride, the same product that is obtained from free sulfur tetrafluoride and cyanogen halides by the process of U.S. Patent No. 2,862,029.

Since obvious modifications and equivalents in the invention will be evident to those skilled in the chemical arts, we propose to be bound solely by the appended claims.

The embodiments of the invention in which an exclusive property or privilege is claimed are defined as follows:

1. A compound of the formula, $SF_4 \cdot MF$, wherein M is a univalent Group I metal of atomic number 11–55.

2. $SF_4 \cdot CsF$.

3. A process of preparing $SF_5Cl$ comprising contacting sulfur tetrafluoride with chlorine and a compound of the formula MF, wherein M is a univalent Group I metal of atomic number 11–55, at a temperature of 0–500° C.

4. The process of claim 3 wherein MF is silver fluoride.

5. The process of claim 3 wherein MF is potassium fluoride.

6. The process of claim 3 wherein MF is cesium fluoride.

7. A process of preparing $SF_5Cl$ comprising contacting sulfur tetrafluoride with a compound of the formula MF, wherein M is a univalent Group I metal of atomic number 11–55, at a temperature of 0–500° C. and contacting the product thereby obtained with chlorine at 0–500° C.

8. The process of claim 7 wherein MF is cesium fluoride.

9. In the process of preparing $SF_5Cl$, the step of contacting $SF_4 \cdot CsF$ with chlorine at a temperature of 0–500° C.

10. In the process of preparing $SF_5Cl$, the step of preparing $SF_4 \cdot CsF$ by contacting cesium fluoride with sulfur tetrafluoride at a temperature of 0–500° C.

11. A process of preparing $SF_4 \cdot MF$ which comprises contacting MF with $SF_4$ at a temperature of 0–500° C., M being a univalent Group I metal of atomic number 11–55.

12. The process of preparing $SF_4 \cdot CsF$ which comprises contacting $SF_4$ with CsF at a temperature of 25 to 350° C.

References Cited
UNITED STATES PATENTS 2,992,073    7/1961    Tullock _____ 23—367 X
3,000,694    9/1961    Smith et al. _____ 23—367

OTHER REFERENCES

Hepworth et al.: "Chemistry and Industry," Nov. 19, 1955, pages 1516–1517.

MILTON WEISSMAN, *Primary Examiner.*

UNITED STATES PATENT OFFICE
CERTIFICATE OF CORRECTION

Patent No. 3,359,081                          December 19, 1967

Charles W. Tullock et al.

It is hereby certified that error appears in the above numbered patent requiring correction and that the said Letters Patent should read as corrected below.

Column 2, line 26, the equation should appear as shown below instead of as in the patent:

$$SF_4 + Cl_2 + MF \rightarrow SF_5Cl + MCl$$

Signed and sealed this 21st day of January 1969.

(SEAL)
Attest:

Edward M. Fletcher, Jr.                          EDWARD J. BRENNER

Attesting Officer                                         Commissioner of Patents